US011132607B1

United States Patent
Kim et al.

(10) Patent No.: US 11,132,607 B1
(45) Date of Patent: *Sep. 28, 2021

(54) METHOD FOR EXPLAINABLE ACTIVE LEARNING, TO BE USED FOR OBJECT DETECTOR, BY USING DEEP ENCODER AND ACTIVE LEARNING DEVICE USING THE SAME

(71) Applicant: Stradvision, Inc., Pohang-si (KR)

(72) Inventors: Kye-Hyeon Kim, Seoul (KR); Hongmo Je, Pohang-si (KR); Yongjoong Kim, Pohang-si (KR); Wooju Ryu, Pohang-si (KR)

(73) Assignee: Stradvision, Inc., Pohang-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/211,123

(22) Filed: Mar. 24, 2021

Related U.S. Application Data

(60) Provisional application No. 63/020,106, filed on May 5, 2020.

(51) Int. Cl.
 *G06K 9/62* (2006.01)
 *G06N 3/08* (2006.01)
 *G06K 9/00* (2006.01)

(52) U.S. Cl.
 CPC ........... *G06N 3/08* (2013.01); *G06K 9/00624* (2013.01); *G06K 9/6228* (2013.01); *G06K 9/6262* (2013.01)

(58) Field of Classification Search
 CPC .... G06K 9/66; G06K 9/00624; G06K 9/6228; G06K 9/6262; G06T 2207/20132; G06T 2207/20081; G06T 2207/20084; G06T 7/11; G06N 3/08
 See application file for complete search history.

(56) References Cited

U.S. PATENT DOCUMENTS

| 10,970,645 | B1 * | 4/2021 | Kim | G06K 9/6273 |
| 2018/0144241 | A1 * | 5/2018 | Liu | G06N 3/08 |
| 2019/0180443 | A1 * | 6/2019 | Xue | G06K 9/66 |
| 2019/0286891 | A1 * | 9/2019 | Sarkar | G06K 9/00362 |
| 2021/0082107 | A1 * | 3/2021 | Liu | G06K 9/6256 |

\* cited by examiner

*Primary Examiner* — Samir A Ahmed
(74) *Attorney, Agent, or Firm* — Taft Stettinius & Hollister LLP

(57) ABSTRACT

A method for explainable active learning, to be used for an object detector, by using a deep autoencoder is provided. The method includes steps of an active learning device (a) (i) inputting acquired test images into the object detector to detect objects and output bounding boxes, (ii) cropping regions, corresponding to the bounding boxes, in the test images, (iii) resizing the test images and the cropped images into a same size, and (iv) inputting the resized images into a data encoder of the deep autoencoder to output data codes, and (b) (i) confirming reference data codes corresponding to the number of the resized images less than a counter threshold by referring to a data codebook, (ii) extracting specific data codes from the data codes, (iii) selecting specific test images as rare samples, and (iv) updating the data codebook by referring to the specific data codes.

16 Claims, 6 Drawing Sheets

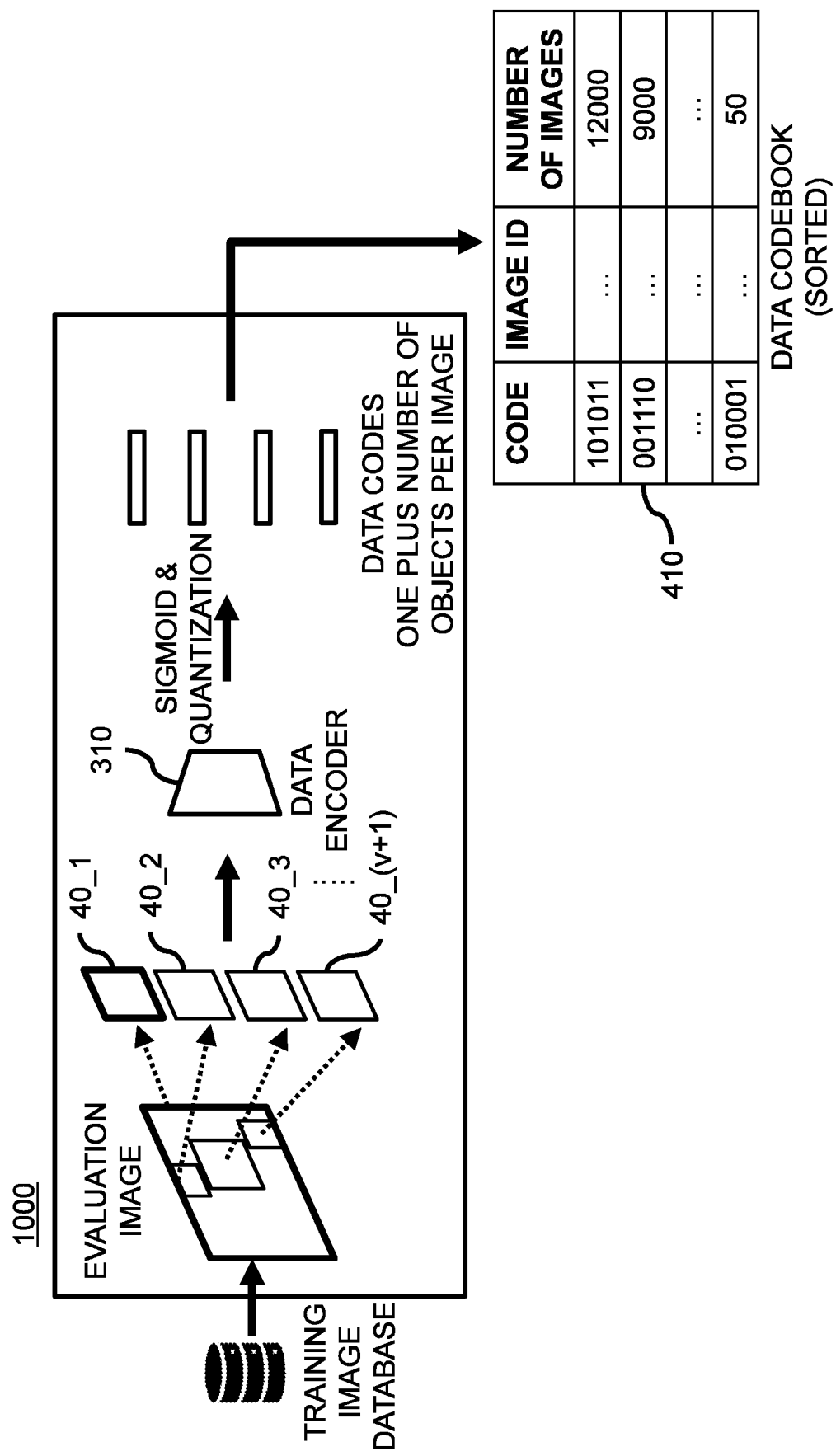

METHOD FOR EXPLAINABLE ACTIVE LEARNING, TO BE USED FOR OBJECT DETECTOR, BY USING DEEP ENCODER AND ACTIVE LEARNING DEVICE USING THE SAME

CROSS REFERENCE TO RELATED APPLICATION

This application claims the benefit of priority to U.S. Provisional Patent Application No. 63/020,106, filed on May 5, 2020, the entire contents of which being incorporated herein by reference.

FIELD OF THE DISCLOSURE

The present disclosure relates to a method for explainable active learning to be used for object detection by using a deep autoencoder and an active learning device using the same; and more particularly, to the method of the explainable active learning, for the object detection by the deep autoencoder, capable of (i) allowing information on whether an object of a specific type is present in an image to be confirmed, (ii) allowing information on why the image is selected to be confirmed and accordingly (iii) allowing the image of the specific type to be sampled, and the active learning device using the same.

BACKGROUND OF THE DISCLOSURE

Recently, many studies of object identification etc. by using machine learning have been done.

One of machine learning techniques, deep learning, which uses a neural network including multiple hidden layers between an input layer and an output layer, shows high performance in the object identification.

The neural network is generally trained via backpropagation using losses.

Conventionally, in order to train a deep learning network, raw data are collected under a data collection policy, and then human labelers annotate the raw data, to thereby generate new training data. Thereafter, by using the new training data and existing training data, the deep learning network is trained, and then, by referring to a result of analysis conducted by human engineers, a training algorithm for the deep learning network is revised and improved. Moreover, the data collection policy and incorrect annotations are revised by referring to the result of the analysis.

However, as the performance of the deep learning network improves, the hard example useful for learning becomes scarce, thus it becomes more difficult to improve the performance of the deep learning network using the new training data. And, as a database of labeled images becomes larger, it also becomes more difficult to improve the performance of the deep learning network, thus the return on investment on the data annotation by the human labelers decreases.

Meanwhile, in order to solve this problem, conventionally, instead of labeling all collected unlabeled images, an active learning technique is used which selects and labels only specific unlabeled images that are expected to have a great influence on, for example, a size of a database where the labeled images are stored, a performance of a model to be trained, etc.

Particularly, in the conventional active learning, a feature space is divided into subspaces or partitions, and unlabeled images which belongs to a specific subspace corresponding to a small space within a database are acquired as rare examples, i.e., rare images.

Herein, the conventional active learning techniques are applicable only to classification issues.

That is, the conventional active learning techniques may map the whole of a given image with a size of H×W onto the feature space, such that images of similar scenes belong to a same subspace.

However, the conventional active learning techniques have difficulty in selecting the rare images to be used for learning of object detection.

For example, images of similar street scenes must be mapped onto different subspaces depending on presence or absence of pedestrians, but the conventional active learning techniques simply classify them into the same subspace.

In addition, the conventional active learning techniques have a disadvantage in that in case of an image where a stop sign appears, the image cannot be mapped onto another subspace because the small size of the stop sign compared to the size of the entire image makes it harder to classify the image into said another subspace.

That is, the area of the stop sign may be an area of an extremely small size such as a size of 50×50 and a size of 100×100, etc. on the image of a size of 1920×1080. In order to select images with one or more stop signs, all other parts except the areas of the stop signs should be ignored, however, the conventional active learning techniques cannot perform such processes.

SUMMARY OF THE DISCLOSURE

It is an object of the present disclosure to solve all the aforementioned problems.

It is another object of the present disclosure to easily acquire one or more rare samples according to types of one or more objects in active learning.

It is still another object of the present disclosure to acquire the rare samples, on which information on whether an object of a specific type appears and information on characteristics of a whole scene are reflected, in the active learning.

It is still yet another object of the present disclosure to easily identify reasons of selecting the rare samples in the active learning.

It is still yet another object of the present disclosure to easily select one or more unlabeled images only of a certain type from the acquired rare samples in the active learning.

In accordance with one aspect of the present disclosure, there is provided a method for explainable active learning, to be used for an object detector, by using a deep autoencoder, including steps of: (a) based on one or more acquired test images, an active learning device performing or supporting another device to perform (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing into a same size, to thereby generate first resized images for testing to (n+1)-th resized images for testing, and (iv) a process of inputting the first resized images for testing to the (n+1)-th resized images for testing into a data encoder of the deep autoencoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing; and (b) the active learning device performing or supporting another device to perform (i) a process of confirming reference data codes corresponding to the number of the resized images equal to or less than a counter threshold by referring to a data codebook, wherein the data codebook is created or updated by referring to previous training images used for pre-training the object detector and wherein the data codebook lists the number of the resized images per data code, (ii) a process of extracting specific data codes for testing, respectively corresponding to the reference data codes, from the first data codes for testing to the (n+1)-th data codes for testing, (iii) a process of selecting specific test images, corresponding to the specific data codes for testing, among the test images, as rare samples to be used for re-training the object detector, and (iv) a process of updating the data codebook by referring to the specific data codes for testing corresponding to the rare samples.

As one example, the method further includes a step of: (c) the active learning device performing or supporting another device to perform a process of re-training the object detector by using the previous training images and the rare samples.

As one example, at the step of (a), the active learning device performs or supports another device to perform a process of mapping mis-detected bounding boxes for testing, among the bounding boxes for testing, into background data codes.

As one example, at the step of (b), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1.

As one example, at the step of (a), the active learning device performs or supports another device to perform a process of setting a detection threshold of the object detector lower than that at a time of training the object detector.

As one example, the method, before the step of (a), further includes a step of: (a01) the active learning device performing or supporting another device to perform (i) a process of cropping one or more object regions for training in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, and (iv) a process of inputting the first resized object images for training to the (t+1)-th resized object images for training and the first resized background images for training to the u-th resized background images for training into the data encoder of the deep autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training; and (a02) the active learning device performing or supporting another device to perform (i) a process of inputting the first object data codes for training to the (t+1)-th object data codes for training into a data decoder of the deep autoencoder, to thereby allow the data decoder to decode the first object data codes for training to the (t+1)-th object data codes for training and thus to output first reconstructed images for training to (t+1)-th reconstructed images for training, (ii) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training, and (iii) a process of training the data encoder by using one or more background losses calculated by referring to the first background data codes for training to the u-th background data codes for training.

As one example, the method further includes a step of: (a03) the active learning device performing or supporting another device to perform (i) a process of cropping one or more object regions for evaluation in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

As one example, at the step of (a01), the active learning device performs or supports another device to perform a process of allowing the number of the cropped background images for training, corresponding to one of the training images, to be one to three times the number of the cropped object images for training of said one of the training images.

In accordance with another aspect of the present disclosure, there is provided an active learning device for explainable active learning, to be used for an object detector, by using a deep autoencoder, including: at least one memory that stores instructions; and at least one processor configured to execute the instructions to perform or support another device to perform: (I) based on one or more acquired test images, (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing into a same size, to thereby generate first resized images for testing to (n+1)-th resized images for testing, and (iv) a process of inputting the first resized images for testing to the (n+1)-th resized images for testing into a data encoder of the deep autoencoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing, and (II) (i) a process of confirming reference data codes corresponding to the number of the resized images equal to or less than a counter threshold by referring to a data codebook, wherein the data codebook is created or updated by referring to previous training images used for pre-training the object detector and wherein the data codebook lists the number of the resized images per data code, (ii) a process of extracting specific data codes for testing, respectively corresponding to the reference data codes, from the first data codes for testing to the (n+1)-th data codes for testing, (iii) a process of selecting specific test images, corresponding to the specific data codes for testing, among the test images, as rare samples to be used for re-training the object detector, and (iv) a process of updating the data codebook by referring to the specific data codes for testing corresponding to the rare samples.

As one example, the processor further performs or supports another device to perform: (III) a process of re-training the object detector by using the previous training images and the rare samples.

As one example, at the process of (I), the processor performs or supports another device to perform a process of mapping mis-detected bounding boxes for testing, among the bounding boxes for testing, into background data codes.

As one example, at the process of (II), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1.

As one example, at the process of (I), the processor performs or supports another device to perform a process of setting a detection threshold of the object detector lower than that at a time of training the object detector.

As one example, before the process of (I), the processor further performs or supports another device to perform: (I01) (i) a process of cropping one or more object regions for training in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, and (iv) a process of inputting the first resized object images for training to the (t+1)-th resized object images for training and the first resized background images for training to the u-th resized background images for training into the data encoder of the deep autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training; and (102) (i) a process of inputting the first object data codes for training to the (t+1)-th object data codes for training into a data decoder of the deep autoencoder, to thereby allow the data decoder to decode the first object data codes for training to the (t+1)-th object data codes for training and thus to output first reconstructed images for training to (t+1)-th reconstructed images for training, (ii) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training, and (iii) a process of training the data encoder by using one or more background losses calculated by referring to the first background data codes for training to the u-th background data codes for training.

As one example, the processor further performs or supports another device to perform: (I03) (i) a process of cropping one or more object regions for evaluation in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

As one example, at the process of (I01), the processor performs or supports another device to perform a process of allowing the number of the cropped background images for training, corresponding to one of the training images, to be one to three times the number of the cropped object images for training of said one of the training images.

In addition, recordable media readable by a computer for storing a computer program to execute the method of the present disclosure is further provided.

BRIEF DESCRIPTION OF THE DRAWINGS

The following drawings to be used to explain example embodiments of the present disclosure are only part of example embodiments of the present disclosure and other drawings can be obtained based on the drawings by those skilled in the art of the present disclosure without inventive work.

FIG. 6 is a drawing schematically illustrating processes of generating the data codebook in accordance with one example embodiment of the present disclosure.

DETAILED DESCRIPTION OF THE PREFERRED EMBODIMENTS

Figure 1:
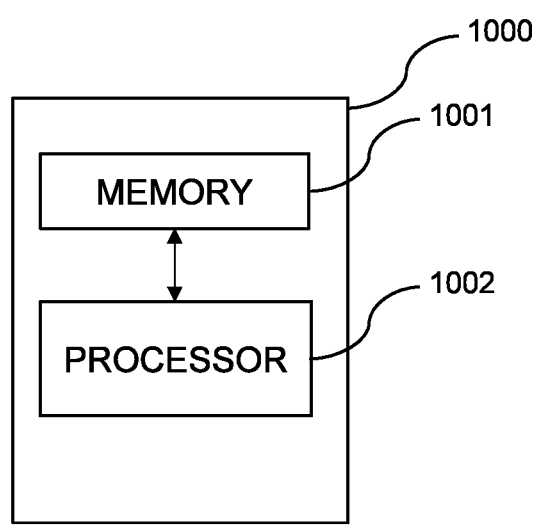
FIG. 1 is a drawing schematically illustrating an active learning device performing explainable active learning, to be used for an object detector, by using a deep autoencoder in accordance with one example embodiment of the present disclosure.

Detailed explanation on the present disclosure to be made below refer to attached drawings and diagrams illustrated as specific embodiment examples under which the present disclosure may be implemented to make clear of purposes, technical solutions, and advantages of the present disclosure. These embodiments are described in sufficient detail to enable those skilled in the art to practice the invention.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

Moreover, the present disclosure covers all possible combinations of example embodiments indicated in this specification. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, similar reference numerals refer to the same or similar functionality throughout the several aspects.

To allow those skilled in the art to carry out the present disclosure easily, the example embodiments of the present disclosure by referring to attached diagrams will be explained in detail as shown below.

FIG. 1 is a drawing schematically illustrating an active learning device performing explainable active learning, to be used for an object detector, by using a deep autoencoder in accordance with one example embodiment of the present disclosure. By referring to FIG. 1, the active learning device 1000 may include a memory 1001 for storing instructions to perform the explainable active learning by using the deep autoencoder in order to sample one or more training images to be used for training the object detector, and a processor 1002 for performing the explainable active learning by using the deep autoencoder in order to sample the training images to be used for training the object detector according to the instructions in the memory 1001.

Specifically, the active learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include software configuration of OS and applications that achieve specific purposes.

However, such description of the computing device does not exclude an integrated device including any combination of a processor, a memory, a medium, or any other computing components for implementing the present disclosure.

Figure 2:
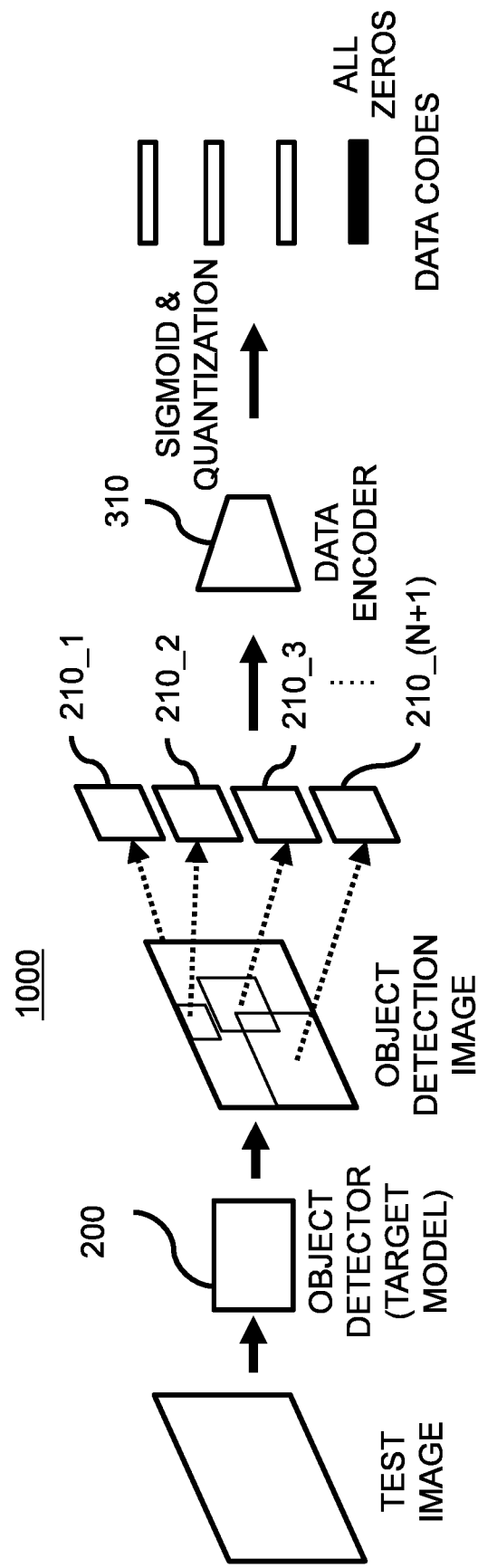
FIG. 2 is a drawing schematically illustrating a method for the explainable active learning, to be used for the object detector, by using the deep autoencoder in accordance with one example embodiment of the present disclosure.

A method for the explainable active learning by using the active learning device 1000 configured as such is described by referring to FIG. 2 as follows.

First, based on one or more acquired test images, the active learning device 1000 may perform or support another device to perform a process of inputting the test images into the object detector 200, to thereby allow the object detector 200 to detect one or more objects for testing in each of the test images and thus to output one or more bounding boxes for testing respectively corresponding to the objects for testing. Also, the object detector 200 may output class information for testing corresponding to the objects for testing and various detection information related to the objects for testing.

Herein, the active learning device 1000 may perform or support another device to perform a process of setting a detection threshold of the object detector 200 at a time of testing the object detector 200 as low, for example, lower than that at a time of training the object detector 200, to thereby allow the object detector 200 to detect as many bounding boxes for testing as possible including some specific bounding boxes whose foreground class scores on the test images are low. That is, if the detection threshold of the object detector 200 is lowered at the time of testing the object detector 200, the object detector 200 may be allowed to detect more of the bounding boxes for testing, including the specific bounding boxes whose foreground class scores on the test images are low, compared to a case, for example, where the specific bounding boxes whose foreground class scores on the training images are low are not detected due to the higher detection threshold used at the time of training the object detector 200. As a result, an incorrect determination, indicating that an object is determined incorrectly as absent when it is not, may be prevented as much as possible, and especially, an object of a type difficult to detect may be properly detected.

Also, the object detector 200 may have been trained in advance to detect objects on inputted images.

Also, the test images may be (1) images acquired from an image capture device linked to a device where the object detector 200 is installed, (2) images collected for tasks to be performed by the object detector 200, or (3) unlabeled images on which a labeling process is not performed.

As one example, the test images may be driving images acquired by a camera, a LiDAR, a radar, etc. while a vehicle is driven.

Next, the active learning device 1000 may perform or support another device to perform a process of cropping one or more regions, respectively corresponding to the bounding boxes for testing, in each of the test images, to thereby generate first cropped images for testing to n-th cropped images for testing. Herein, n may be an integer equal to or greater than 1.

And, the active learning device 1000 may perform or support another device to perform a process of resizing (1) each of the test images and (2) the first cropped images for testing to the n-th cropped images for testing corresponding to each of the test images into a same size, to thereby generate first resized images for testing 210_1 to (n+1)-th resized images for testing 210 (n+1).

Next, the active learning device 1000 may perform or support another device to perform a process of inputting the first resized images for testing 210_1 to the (n+1)-th resized images for testing 210 (n+1) into a data encoder 310 of the deep autoencoder, to thereby allow the data encoder 310 to encode the first resized images for testing 210_1 to the (n+1)-th resized images for testing 210 (n+1) and thus to output first data codes for testing to (n+1)-th data codes for testing respectively corresponding to the first resized images for testing 210_1 to the (n+1)-th resized images for testing 210 (n+1).

Herein, the active learning device 1000 may apply an activation function, such as a sigmoid function, to outputs from the data encoder 310, to thereby acquire the first data codes for testing to the (n+1)-th data codes for testing.

And the data codes may be in d dimension and may have a range of [0, 1], and also, may be subspaces for the respective resized images. Herein, d may be an integer equal to or greater than 1. And the data codes corresponding to background may be represented by all zeros. Also, the data codes of the resized images corresponding to mis-detected bounding boxes for testing may be mapped into background data codes, i.e., all zeros.

Figure 3:
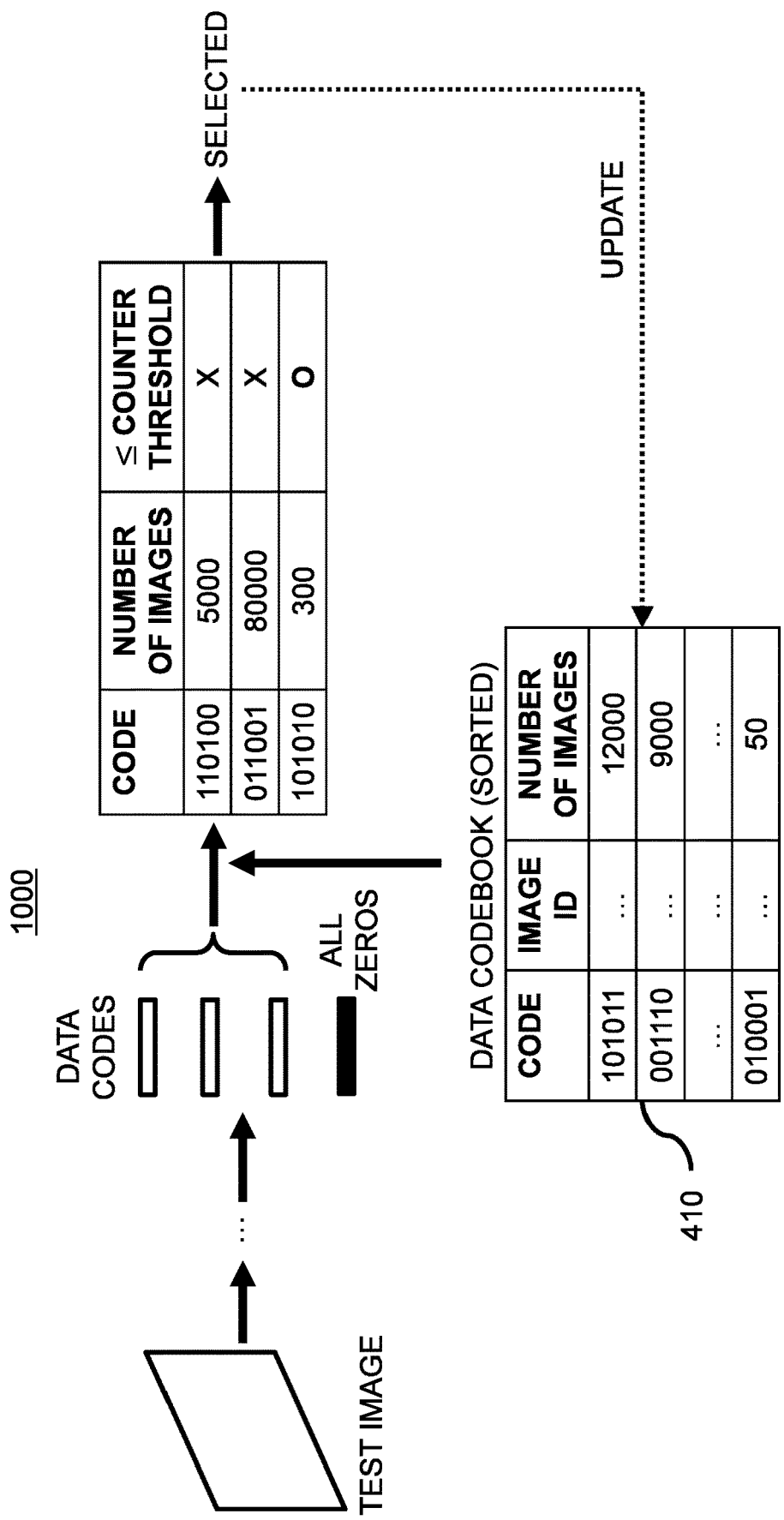
FIG. 3 is a drawing schematically illustrating processes of selecting training images, to be used for training the object detector, by using a data codebook, in accordance with one example embodiment of the present disclosure.

Next, by referring to FIG. 3, the active learning device 1000 may perform or support another device to perform (i) a process of confirming reference data codes corresponding to the number of the resized images equal to or less than a counter threshold by referring to a data codebook 410 which is created or updated by referring to previous training images used for pre-training the object detector 200, (ii) a process of extracting specific data codes for testing, respectively corresponding to the reference data codes, from the first data codes for testing to the (n+1)-th data codes for testing, (iii) a process of selecting specific test images, corresponding to the specific data codes for testing, among the test images, as rare samples to be used for re-training the object detector 200, and (iv) a process of updating the data codebook 410 by referring to the specific data codes for testing corresponding to the rare samples. Herein, the data codebook 410 may list the number of the resized images per data code, and processes of generating the data codebook 410 will be described later.

Herein, the counter threshold may be one of (1) a predetermined counted number and (2) the number of the resized images corresponding to a threshold data code at a q-th position, within the data codebook 410, counted in an order from a largest counted number to a smallest counted number of the resized images. Herein, q may be an integer equal to or greater than 1.

That is, if the number of the images corresponding to each of the subspaces, i.e., the data codes, is smaller, then such a subspace may be determined as a rare subspace which has not been learned about sufficiently during pre-training of the object detector 200. Then accordingly, by using the data codebook 410, the specific test images corresponding to the specific data codes for testing, which have not been learned about sufficiently during the pre-training of the object detector 200, may be set as the rare samples. Therefore, the data codebook 410 may be updated by using the specific data codes for testing corresponding to the sampled specific test images, and after re-training the object detector 200, the data codebook 410 may be used as criteria for sampling new rare images from new test images.

And each time the object detector 200 is re-trained, the data codebook 410 may also be updated.

Figure 4:
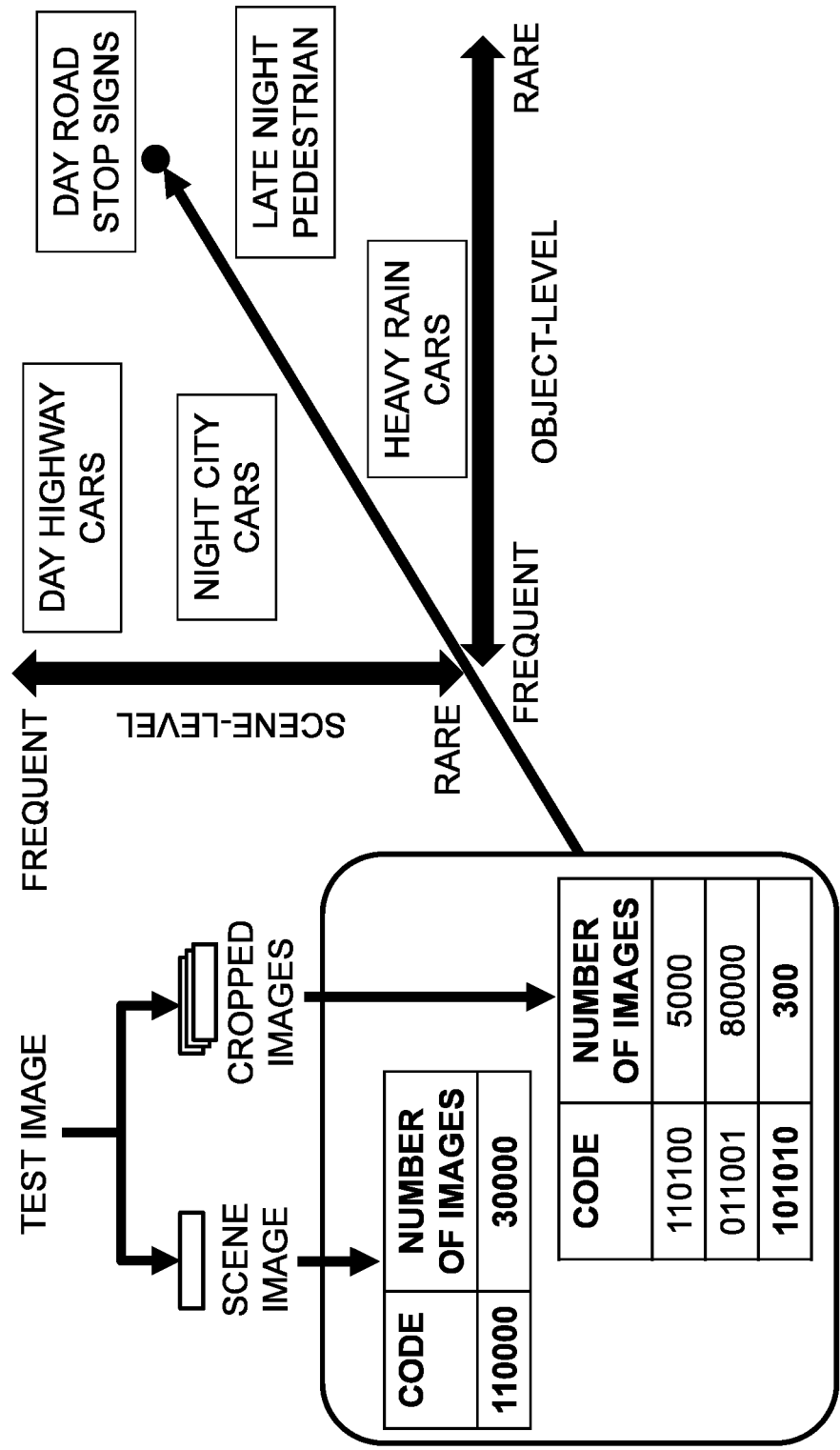
FIG. 4 is a drawing schematically illustrating explanation of reasons of selecting the training images according to the data codebook in accordance with one example embodiment of the present disclosure.

Next, by referring to FIG. 4, one or more reasons that specific test images are selected as the rare samples may be identified by using the data codebook generated as above.

That is, the test images may be explained by using scene levels and object levels with the data codebook, and the reasons of the selection may be identified using the scene levels and the object levels. Herein, the scene levels may represent each frequency of each same scene being detected and the object levels may represent each frequency of each same object being detected.

As one example, while a vehicle is driven on a road in daylight, that is, if a scene of the test images corresponds to "day road", a stop sign will rarely appear.

Also, a vehicle detected in a scene of "heavy rain" appears as blotted and smeared due to the heavy rain, therefore will rarely appear at the object level than a vehicle detected in a scene of "day highway".

Next, the active learning device 1000 may perform or support another device to perform a process of re-training the object detector 200 by using the previous training images and the rare samples.

Meanwhile, processes of training the deep autoencoder and processes of creating the data codebook are described as follows.

Figure 5:
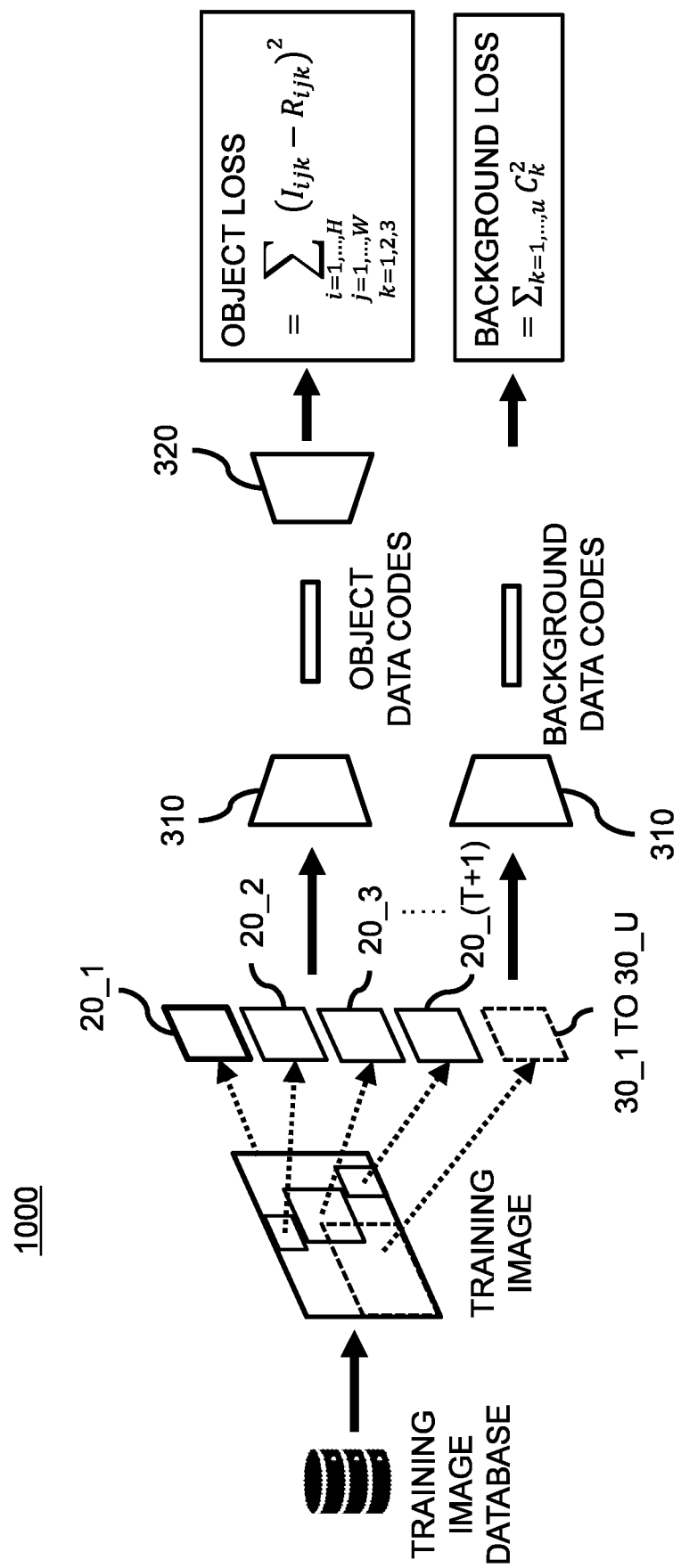
FIG. 5 is a drawing schematically illustrating processes of training the deep autoencoder in accordance with one example embodiment of the present disclosure.

First, by referring to FIG. 5, processes of training the deep autoencoder are described as follows.

The active learning device 1000 may sample the training images to be used for training the deep autoencoder 310 and 320 from a training image database which stores the training images for training a target model, i.e., the object detector.

And the active learning device 1000 may perform or support another device to perform (i) a process of cropping one or more object regions for training in each of the training images, sampled from the training image database to be used for training the object detector, to thereby generate first cropped object images for training to t-th cropped object images for training and (ii) a process of cropping background regions in each of the training images, to thereby generate first cropped background images for training to u-th cropped background images for training. Herein, each of t and u may be an integer equal to or greater than 1.

Herein, the background regions may be randomly cropped so that the number of the cropped background images is one to three times the number of the cropped object images.

Thereafter, the active learning device 1000 may perform or support another device to perform a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training 20_1 to (t+1)-th resized object images for training 20_(t+1) and (2) first resized background images for training 30_1 to u-th resized background images for training 30_u.

Then, the active learning device 1000 may perform or support another device to perform a process of inputting the first resized object images for training 20_1 to the (t+1)-th resized object images for training 20_(t+1) and the first resized background images for training 30_1 to the u-th resized background images for training 30_u into the data encoder 310 of the deep autoencoder, to thereby allow the data encoder 310 to respectively encode the first resized object images for training 20_1 to the (t+1)-th resized object images for training 20_(t+1) and the first resized background images for training 30_1 to the u-th resized background images for training 30_u, and thus to output (1) first object data codes for training to (t+1)-th object data codes for training respectively corresponding to the first resized object images for training 20_1 to the (t+1)-th resized object images for training 20_(t+1) and (2) first background data codes for training to u-th background data codes for training respectively corresponding to the first resized background images for training 30_1 to the u-th resized background images for training 30_u.

Thereafter, the active learning device 1000 may perform or support another device to perform a process of inputting the first object data codes for training to the (t+1)-th object data codes for training into a data decoder 320 of the deep autoencoder, to thereby allow the data decoder 320 to respectively decode the first object data codes for training to the (t+1)-th object data codes for training and thus to output first reconstructed images for training to (t+1)-th reconstructed images for training.

And the active learning device 1000 may perform or support another device to perform (i) a process of training the data decoder 320 and the data encoder 310 by using one or more first object losses to one or more (t+1)-th object losses calculated by referring to the first resized object images for training to the (t+1)-th resized object images for training and the first reconstructed images for training to the (t+1)-th reconstructed images for training and (ii) a process of training the data encoder 310 by using one or more background losses calculated by referring to the first background data codes for training to the u-th background data codes for training.

Herein, the object losses may be calculated as follows.

$$\text{object loss} = \sum_{\substack{i=1,\ldots,H \\ j=1,\ldots,W \\ k=1,2,3}} (I_{ijk} - R_{ijk})^2$$

Herein, I may be a resized image and R may be a reconstructed image.

Also, the background losses may be calculated as follows.

$$\text{background loss} = \sum_{k=1,\ldots,u} C_k^2$$

That is, the active learning device 1000 may (i) allow a whole image and the cropped object images of the respective objects thereon to be reflected on code losses and reconstruction losses and thus to be used for training the data decoder 320 and the data encoder 310 and (ii) allow the cropped background images to be reflected only on the code losses, such that the outputted data codes corresponding to the cropped background images are all zeros, and thus to be used for training the data encoder 310.

Meanwhile, the active learning device 1000 is described above as training the data encoder 310, however, as another example, a separate learning device may be used for training the data encoder 310.

Next, by referring to FIG. 6, processes of creating the data codebook are described as follows.

The active learning device 1000 may sample evaluation images, to be used for creating the data codebook, from the training image database which stores the training images for training the target model, i.e., the object detector.

Herein, the active learning device 1000 may sample the training images from the training image database, and may divide the sampled training images into (1) the training images to be used for training the data encoder 310 and (2) the evaluation images to be used for creating the data codebook. And, such division into the training images and the evaluation images may be performed by using uniform random sampling, such that each of distribution characteristics of the training images and the evaluation images, that is, each rareness of each subspace, is not different from each other.

And the active learning device 1000 may perform or support another device to perform (i) a process of cropping object regions for evaluation in each of the evaluation images sampled from the training image database, to thereby generate first cropped object images for evaluation to v-th cropped object images for evaluation and (ii) a process of resizing (1) each of the evaluation images and (2) the first cropped object images for evaluation to the v-th cropped object images for evaluation corresponding to each of the evaluation images into a same size, to thereby generate first resized object images for evaluation 40_1 to (v+1)-th resized object images for evaluation 40 (v+1). Herein, v may be an integer equal to or greater than 1.

Then the active learning device 1000 may perform or support another device to perform a process of inputting the first resized object images for evaluation 40_1 to the (v+1)-th resized object images for evaluation 40 (v+1) into the trained data encoder 310, to thereby allow the trained data encoder 310 to encode the first resized object images for evaluation 40_1 to the (v+1)-th resized object images for evaluation 40 (v+1) and thus to output first object data codes for evaluation to (v+1)-th object data codes for evaluation respectively corresponding to the first resized object images for evaluation 40_1 to the (v+1)-th resized object images for evaluation 40 (v+1). Herein, the number of the data codes outputted from the data encoder 310 may be one plus the number of the objects for each of the evaluation images.

And the active learning device 1000 may perform or support another device to perform (i) a process of sorting the first object data codes for evaluation to the (v+1)-th object data codes for evaluation by the data codes and (ii) a process of counting the number of the resized images corresponding to each of the data codes to thereby generate the data codebook 410. That is, the number of the resized images per data code may be mapped into each of the data codes, to thereby generate the data codebook 410. Herein, the data codebook 410 may further include image IDs mapped into the data codes. Herein, each of the data codes in the data codebook 410 may correspond to each of the subspaces, and a specific subspace which includes the number of resized images lower than a predetermined threshold may be determined as a rare subspace, i.e., a subspace for selecting rare samples.

Meanwhile, the active learning device 1000 is described above as creating the data codebook 410, however, as another example, a separate learning device or a separate device may be used for creating the data codebook 410.

The present disclosure has an effect of easily acquiring the rare samples according to types of the objects by mapping of a feature space using the object detector and the deep autoencoder together in the active learning.

The present disclosure has another effect of acquiring the rare samples on which information on whether an object of a specific type appears and information on characteristics of a whole scene are reflected according to types of the objects by mapping of the feature space using the object detector and the deep autoencoder together in the active learning.

The present disclosure has still another effect of easily confirming the reasons the rare samples are selected by mapping and encoding the feature space using the object detector and the deep autoencoder together in the active learning.

The present disclosure has still yet another effect of easily selecting only the unlabeled images of specific types by mapping and encoding the feature space using the object detector and the deep autoencoder together in the active learning.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to those skilled in the art. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands include not only a machine language code made by a complier but also a high level code that can be used by an interpreter etc., which is executed by a computer. The aforementioned hardware device can work as more than a software module to perform the action of the present disclosure and vice versa.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for explainable active learning, to be used for an object detector, by using a deep autoencoder, comprising steps of:

(a) based on one or more acquired test images, an active learning device performing (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing into a same size, to thereby generate first resized images for testing to (n+1)-th resized images for testing, and (iv) a process of inputting the first resized images for testing to the (n+1)-th resized images for testing into a data encoder of the deep autoencoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing; and (b) the active learning device performing (i) a process of confirming reference data codes corresponding to the number of the resized images equal to or less than a counter threshold by referring to a data codebook, wherein the data codebook is created or updated by referring to previous training images used for pre-training the object detector and wherein the data codebook lists the number of the resized images per data code, (ii) a process of extracting specific data codes for testing, respectively corresponding to the reference data codes, from the first data codes for testing to the (n+1)-th data codes for testing, (iii) a process of selecting specific test images, corresponding to the specific data codes for testing, among the test images, as rare samples to be used for re-training the object detector, and (iv) a process of updating the data codebook by referring to the specific data codes for testing corresponding to the rare samples.

2. The method of claim 1, further comprising a step of:
(c) the active learning device performing a process of re-training the object detector by using the previous training images and the rare samples.

3. The method of claim 1, wherein, at the step of (a), the active learning device performs a process of mapping misdetected bounding boxes for testing, among the bounding boxes for testing, into background data codes.

4. The method of claim 1, wherein, at the step of (b), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1.

5. The method of claim 1, wherein, at the step of (a), the active learning device performs a process of setting a detection threshold of the object detector lower than that at a time of training the object detector.

6. The method of claim 1, before the step of (a), further comprising a step of:
(a01) the active learning device performing (i) a process of cropping one or more object regions for training in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the Response to Non-Final Office Action t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, and (iv) a process of inputting the first resized object images for training to the (t+1)-th resized object images for training and the first resized background images for training to the u-th resized background images for training into the data encoder of the deep autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training; and (a02) the active learning device performing (i) a process of inputting the first object data codes for training to the (t+1)-th object data codes for training into a data decoder of the deep autoencoder, to thereby allow the data decoder to decode the first object data codes for training to the (t+1)-th object data codes for training and thus to output first reconstructed images for training to (t+1)-th reconstructed images for training, (ii) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training, and (iii) a process of training the data encoder by using one or more background losses calculated by referring to the first background data codes for training to the u-th background data codes for training.

7. The method of claim 6, further comprising a step of:
(a03) the active learning device performing (i) a process of cropping one or more object regions for evaluation in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, and (iv) a process of sorting the first object data codes for evaluation to the (v+1)-th object data codes for evaluation by the data codes and a process of counting the number of the resized images corresponding to each of the data codes to thereby generate the data codebook.

8. The method of claim 6, wherein, at the step of (a01), the active learning device performs a process of allowing the number of the cropped background images for training, corresponding to one of the training images, to be one to three times the number of the cropped object images for training of said one of the training images.

9. An active learning device for explainable active learning, to be used for an object detector, by using a deep autoencoder, comprising:
at least one memory that stores instructions; and
at least one processor configured to execute the instructions to perform: (I) based on one or more acquired test images, (i) a process of inputting the test images into the object detector, to thereby allow the object detector to detect one or more objects for testing in each of the test images and thus to output bounding boxes for testing corresponding to the objects for testing, (ii) a process of cropping one or more regions, respectively corresponding to the bounding boxes for testing, in each of the test images, to thereby generate first cropped images for testing to n-th cropped images for testing wherein n is an integer equal to or greater than 1, (iii) a process of resizing (1) each of the test images and (2) the first cropped images for testing to the n-th cropped images for testing into a same size, to thereby generate first resized images for testing to (n+1)-th resized images for testing, and (iv) a process of inputting the first resized images for testing to the (n+1)-th resized images for testing into a data encoder of the deep autoencoder, to thereby allow the data encoder to encode the first resized images for testing to the (n+1)-th resized images for testing and thus to output first data codes for testing to (n+1)-th data codes for testing respectively corresponding to the first resized images for testing to the (n+1)-th resized images for testing, and (II) (i) a process of confirming reference data codes corresponding to the number of the resized images equal to or less than a counter threshold by referring to a data codebook, wherein the data codebook is created or updated by referring to previous training images used for pre-training the object detector and wherein the data codebook lists the number of the resized images per data code, (ii) a process of extracting specific data codes for testing, respectively corresponding to the reference data codes, from the first data codes for testing to the (n+1)-th data codes for testing, (iii) a process of selecting specific test images, corresponding to the specific data codes for testing, among the test images, as rare samples to be used for re-training the object detector, and (iv) a process of updating the data codebook by referring to the specific data codes for testing corresponding to the rare samples.

10. The active learning device of claim 9, wherein the processor further performs:
   (III) a process of re-training the object detector by using the previous training images and the rare samples.

11. The active learning device of claim 9, wherein, at the process of (I), the processor performs a process of mapping mis-detected bounding boxes for testing, among the bounding boxes for testing, into background data codes.

12. The active learning device of claim 9, wherein, at the process of (II), the counter threshold is one of (1) a predetermined counted number and (2) the number of the resized images corresponding to a threshold data code at a q-th position, within the data codebook, counted in an order from a largest counted number to a smallest counted number of the resized images wherein q is an integer equal to or greater than 1.

13. The active learning device of claim 9, wherein, at the process of (I), the processor performs a process of setting a detection threshold of the object detector lower than that at a time of training the object detector.

14. The active learning device of claim 9, wherein, before the process of (I), the processor further performs:
   (I01) (i) a process of cropping one or more object regions for training in each of training images, sampled from a training image database to be used for training the object detector, to thereby generate first cropped object images for training to t-th cropped object images for training wherein t is an integer equal to or greater than 1, (ii) a process of cropping background regions in each of the training images, to thereby generate first cropped background images for training to u-th cropped background images for training wherein u is an integer equal to or greater than 1, (iii) a process of resizing (1) each of the training images, (2) the first cropped object images for training to the t-th cropped object images for training corresponding to each of the training images, and (3) the first cropped background images for training to the u-th cropped background images for training corresponding to each of the training images into a same size, to thereby generate (1) first resized object images for training to (t+1)-th resized object images for training and (2) first resized background images for training to u-th resized background images for training, and (iv) a process of inputting the first resized object images for training to the (t+1)-th resized object images for training and the first resized background images for training to the u-th resized background images for training into the data encoder of the deep autoencoder, to thereby allow the data encoder to encode the first resized object images for training to the (t+1)-th resized object images for training and the first resized background images for training to the u-th resized background images for training, and thus to output (1) first object data codes for training to (t+1)-th object data codes for training respectively corresponding to the first resized object images for training to the (t+1)-th resized object images for training and (2) first background data codes for training to u-th background data codes for training respectively corresponding to the first resized background images for training to the u-th resized background images for training; and
   (I02) (i) a process of inputting the first object data codes for training to the (t+1)-th object data codes for training into a data decoder of the deep autoencoder, to thereby allow the data decoder to decode the first object data codes for training to the (t+1)-th object data codes for training and thus to output first reconstructed images for training to (t+1)-th reconstructed images for training, (ii) a process of training the data decoder and the data encoder by using one or more first object losses to one or more (t+1)-th object losses calculated by referring to the first resized object images for training to the (t+1)-th resized object images for training and the first reconstructed images for training to the (t+1)-th reconstructed images for training, and (iii) a process of training the data encoder by using one or more background losses calculated by referring to the first background data codes for training to the u-th background data codes for training.

15. The active learning device of claim 14, wherein the processor further performs:
   (I03) (i) a process of cropping one or more object regions for evaluation in each of the evaluation images sampled from the training image database, to thereby generate first cropped object images for evaluation to v-th cropped object images for evaluation wherein v is an integer equal to or greater than 1, (ii) a process of resizing (1) each of the evaluation images and (2) the first cropped object images for evaluation to the v-th cropped object images for evaluation corresponding to each of the evaluation images into a same size, to thereby generate first resized object images for evaluation to (v+1)-th resized object images for evaluation, (iii) a process of inputting the first resized object images for evaluation to the (v+1)-th resized object images for evaluation into the data encoder, to thereby allow the data encoder to encode the first resized object images for evaluation to the (v+1)-th resized object images for evaluation and thus to output first object data codes for evaluation to (v+1)-th object data codes for evaluation respectively corresponding to the first resized object images for evaluation to the (v+1)-th resized object images for evaluation, (iv) a process of sorting the first object data codes for evaluation to the (v+1)-th object data codes for evaluation by the data codes and a process of counting the number of the resized images corresponding to each of the data codes to thereby generate the data codebook.

16. The active learning device of claim 14, wherein, at the process of (I01), the processor performs a process of allowing the number of the cropped background images for training, corresponding to one of the training images, to be one to three times the number of the cropped object images for training of said one of the training images.

* * * * *